United States Patent
Fromentin et al.

(10) Patent No.: US 11,774,636 B2
(45) Date of Patent: Oct. 3, 2023

(54) BLUE LIGHT CUTTING OPTICAL MATERIAL HAVING A BLUISH APPEARANCE

(71) Applicant: Essilor International, Charenton-le-Pont (FR)

(72) Inventors: Pierre Fromentin, Bangkok (TH); Armel Jimenez, Charenton-le-Pont (FR); Waranya Phompan, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 510 days.

(21) Appl. No.: 17/051,863

(22) PCT Filed: Apr. 29, 2019

(86) PCT No.: PCT/EP2019/060930
§ 371 (c)(1),
(2) Date: Oct. 30, 2020

(87) PCT Pub. No.: WO2019/211242
PCT Pub. Date: Nov. 7, 2019

(65) Prior Publication Data
US 2021/0116604 A1    Apr. 22, 2021

(30) Foreign Application Priority Data
Apr. 30, 2018  (EP) .................................... 18315009

(51) Int. Cl.
*G02B 1/04*  (2006.01)
*C08G 18/24*  (2006.01)
*C08G 18/38*  (2006.01)
*G02C 7/04*  (2006.01)

(52) U.S. Cl.
CPC ........... *G02B 1/043* (2013.01); *C08G 18/242* (2013.01); *C08G 18/3868* (2013.01); *G02C 7/04* (2013.01)

(58) Field of Classification Search
None
See application file for complete search history.

(56) References Cited

U.S. PATENT DOCUMENTS

| | | | |
|---|---|---|---|
| 4,528,311 A | 7/1985 | Beard et al. | |
| 4,689,387 A | 8/1987 | Kajimoto et al. | |
| 4,775,733 A | 10/1988 | Kanemura et al. | |
| 5,059,673 A | 10/1991 | Kanemura et al. | |
| 5,087,758 A | 2/1992 | Kanemura et al. | |
| 5,191,055 A | 3/1993 | Kanemura et al. | |
| 5,962,617 A | 10/1999 | Slagel | |
| 6,127,505 A | 10/2000 | Slagel | |
| 6,534,443 B2 | 3/2003 | Inuzuka | |
| 6,554,873 B2 | 4/2003 | Inuzuka | |
| 8,360,574 B2 | 1/2013 | Ishak et al. | |
| 2015/0316688 A1* | 11/2015 | Cefalo | G02B 1/14 252/586 |

FOREIGN PATENT DOCUMENTS

| | | |
|---|---|---|
| EP | 1877839 | 12/2008 |
| EP | 3203271 | 9/2017 |
| EP | 3282290 | 2/2018 |
| JP | 2000-147201 | 5/2000 |
| JP | 2000-241601 | 9/2000 |
| JP | 2000-314088 | 11/2000 |
| JP | 2004-315556 | 11/2004 |
| JP | 2008-056854 | 3/2008 |
| WO | WO 1998/37115 | 8/1998 |
| WO | WO 2007/146933 | 12/2007 |
| WO | WO 2013/084177 | 6/2013 |
| WO | WO 2014/077166 | 5/2014 |
| WO | WO 2014/133111 | 9/2014 |
| WO | WO 2015/097186 | 7/2015 |
| WO | WO 2015/097492 | 7/2015 |
| WO | WO 2015/171507 | 11/2015 |
| WO | WO 2017/077357 | 5/2017 |
| WO | WO 2017/077358 | 5/2017 |
| WO | WO 2017/077359 | 5/2017 |
| WO | WO 2017/137372 | 8/2017 |
| WO | WO 2017/182639 | 10/2017 |
| WO | WO-2017182639 A1 * | 10/2017 ........... C07D 249/20 |
| WO | WO 2018/021567 | 2/2018 |
| WO | WO 2018/029540 | 2/2018 |

OTHER PUBLICATIONS

European Search Report from the European Patent Office issued in Patent Application No. EP18315009 dated Aug. 22, 2018.
International Search Report and Written Opinion of the International Searching Authority issued in Patent Application PCT/EP2019/060930 dated Jun. 24, 2019.
Office Action issued in corresponding Japanese Application No. 2020560357, dated Mar. 7, 2023.

* cited by examiner

*Primary Examiner* — Peter A Salamon
(74) *Attorney, Agent, or Firm* — Norton Rose Fulbright US LLP

(57) ABSTRACT

The present invention relates to an optical material cutting blue light, comprising at least one UV absorber that at least partially blocks light having a wavelength ranging from 400 to 450 nm, at least one absorbing dye A having its maximum absorption wavelength in the range from 520 nm to 640 nm, the optical material being made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers, the optical material having a colorimetric coefficient b* as defined in the CIE (1976) L*a*b* international colorimetric system that is lower than or equal to 6, and a hue angle h higher than or equal to 120° and lower than or equal to 180°, for an optical material thickness of 2 mm.

18 Claims, No Drawings

BLUE LIGHT CUTTING OPTICAL MATERIAL HAVING A BLUISH APPEARANCE

CROSS-REFERENCE TO RELATED APPLICATIONS

This application is a national phase application under 35 U.S.C. § 371 of International Application No. PCT/EP2019/060930 filed 29 Apr. 2019, which claims priority to European Patent Application No. 18315009.3 filed 30 Apr. 2018. The entire contents of each of the above-referenced disclosures is specifically incorporated by reference herein without disclaimer.

The present invention relates to optical materials comprising compounds that absorb UV light and at least part of the blue light of the visible spectrum, and more particularly to ophthalmic lenses containing these materials, having a low level of yellowness, a good transparency and a bluish appearance. The present invention is also directed to methods of making these materials.

Light that is visible to humans extends over a light spectrum ranging from a 380 nanometers (nm) wavelength to a 780 nm wavelength approximately. The part of this spectrum, ranging from around 380 nm to around 500 nm, corresponds to a high-energy, essentially blue light.

Many studies (see for example Kitchel E., "The effects of blue light on ocular health", Journal of Visual Impairment and Blindness Vol. 94, No. 6, 2000 or Glazer-Hockstein and al., Retina, Vol. 26, No. 1. pp. 1-4, 2006) suggest that part of the blue light has phototoxic effects on the human eye health, and especially on the retina. Ocular photobiology studies demonstrated that an excessively prolonged or intense exposure to blue light may induce severe ophthalmic diseases such as age-related macular degeneration (ARMD) or cataract.

Another recent publication Arnault E., Barrau C., Nanteau C., Gondouin P., Bigot K., Vienot F., Gutman E., Fontaine V., Villette T., Cohen-Tannoudji D., Sahel J. A., Picaud S.: "Phototoxic action spectrum on a retinal pigment epithelium model of age related macular degeneration exposed to sunlight normalized conditions", Aug. 23, 2013, PLOS One, August 23; 8(8):e71398. doi: 10.1371/journal.pone.0071398. eCollection 2013 defined the precise spectrum of light retinal toxicity in physiological irradiance conditions on an in vitro model of age-related macular degeneration using primary cultures of porcine retinal pigment epithelium cellsincubated for 6 hours with different concentrations of a photosensitive derivative of the visual pigment, N-retinylidene-N-retinylethanolamine (A2E).

Thus, it is recommended to limit the exposure of the eyes to blue light potentially harmful, in particular as regards the wavelength band with an increased dangerousness (420-450 nm). ISO 8980-3 standard:2003 (E) Table B1, defines the $B(\lambda)$ blue light dangerousness function.

Eyeglasses are particularly suitable to offer protection against transmission of such potentially harmful blue light to the retina.

It is furthermore necessary to eliminate as much as possible the harmful influence of ultraviolet light (UV light) on the eye of a wearer of the lens. Ultraviolet (UV) light is the portion of the luminous spectrum below 380 nm and ranging up to 100 nm. The UV spectrum has many bands, especially UVA, UVB and UVC bands. Amongst those UV bands reaching the earth surface, the UVA band, ranging from 315 nm to 380 nm, and the UVB band, ranging from 280 nm to 315 nm, are particularly harmful to the retina.

It has already been suggested, for example in the patent application WO 2008/024414, to cut at least partially UV light and/or the troublesome part of the blue light spectrum from 400 nm to 460 nm, by means of a filter inhibiting the light in a suitable wavelength range, through absorption or through reflection. This can also be done by incorporating a yellow absorbing dye into the optical element.

The U.S. Pat. No. 8,360,574 discloses an ophthalmic lens comprising a selective light wavelength filter that blocks 5-50% of light having a wavelength in the range of 400-460 nm, transmits at least 80% of light having a wavelength in the range of 460-700 nm, and exhibits a yellowness index of not more than 15.

Generally, blocking visible wavelengths such as undesirable blue light affects color balance, color vision if one looks through the optical material, and the color in which the optical material is perceived. Indeed, optical materials incorporating at least one UV absorber or yellow dye that at least partially blocks light having a wavelength ranging from 420 to 450 nm tend to produce a residual color tint in the optical article as a "side effect", the latter appearing yellow, brown or amber. This is esthetically unacceptable for many optical applications, and may interfere with the normal color perception of the user if the device is an ophthalmic lens.

In order to compensate for the yellowing effect of the blue light blocking compounds and obtaining an optical article having a cosmetically acceptable appearance for the wearer and when viewed by an external observer, a color balancing component or a mixture of color balancing components can be added to the optical article. The color-balancing component employed to at least partially offset the yellowing effect and obtaining a fairly colorless appearance is generally a blue tinting dye, or a mixture of dyes used in suitable proportions.

However, optical materials cutting blue light generally suffer from an unpleasant final color after color balancing, which can be described as having a grayish yellowish and/or greenish tinge. Moreover, this approach is not satisfactorily as perfect neutralization, e.g. pure greyish aspect, is difficult to achieve in terms of reproducibility.

This problem is more acute when the polymer matrix of the optical material is naturally slightly yellow, or when optical materials contain reactive components such as peroxide, which consequently increases the yellow contribution. This is the case for materials such as polythiourethane materials, polyurethane-urea materials, materials obtained from polyepisulfides or those obtained from allylic compositions. Further, when the blue light blocking means comprises compounds incorporated into the optical material composition to be polymerized, yellow color might be increased upon heating/polymerization.

Optical filtering means such as UV absorbers are frequently incorporated into optical articles in order to reduce or prevent UV light from reaching the retina (in particular in ophthalmic lens materials), but also to protect the substrate material itself, thus preventing it from weathering and becoming brittle and/or yellow.

The UV absorber can be incorporated into the finished product through different technologies at different locations, generally in a coating, but also in the bulk substrate, for example by impregnation of the substrate, or by incorporation in a substrate precursor formulation.

The Japanese patent application JP 2008-056854 discloses a polymerizable composition for lenses comprising polythiol and polyiso(thio)cyanate monomers and at least one specific benzotriazole-based ultraviolet absorber, wherein the optical cut rate at a wavelength of 400 nm of a 9 mm-thick polythiourethane resin sheet obtained from the composition is 99.5% or more.

The Japanese patent application JP 2000-147201 discloses a plastic lens ensuring a high visible radiation transmittance made of a sulfur containing resin (e.g., polythiourethane or polyepisulfide), further containing a high molecular weight UV absorber having miscibility with the base resin, which can be a benzophenone or benzotriazole UV absorber, such as polyethylene glycol monoesters and diesters of 3-[5-(2-benzotriazoyl)-3-t-butyl-4-hydroxyphenyl] propionic acid (UVC2). A UV absorber less liable to absorb yellow, brown, etc., in the visible radiation region is preferably used, leading to a reduced light cut-off wavelength.

The application WO 2014/133111 discloses an optical material containing one or more ultraviolet absorbers having a maximum absorption peak in a range from 350 nm to 370 nm, and optionally a bluing agent, which is configured to restrict exposure of the eyes of a user to blue light with relatively short wavelengths, specifically in the 400 to 420 nm wavelength range. The optical transmittance at the 410 nm wavelength is 10% or less, while the optical transmittance at the 440 nm wavelength is 80% or more.

The applications WO 2017/077357 and WO 2017/077358 disclose an optical article comprising a substrate having a colorimetric coefficient b* as defined in the CIE (1976) L*a*b* international colorimetric system that is lower than or equal to 4 or 7, a relative light transmission factor in the visible spectrum Tv higher than or equal to 87%, and blocking at least 8% of light having a wavelength ranging from 420 to 450 nm arriving on its front main face. The optical article may comprise an optical filtering means that at least partially blocks light having a wavelength ranging from 420 to 450 nm, such as an absorbing dye and/or UV absorber, and optionally a second dye or mixture of dyes acting as a color balancing component. These compounds can be incorporated in the substrate and/or the same or different layers deposited at the surface of the substrate.

The application WO 2018/021567 discloses an eyeglass lens that is described as having a color tone that is slightly bluish. The eyeglass lens that includes a base material comprising a resin composition obtained by polymerizing a polymerizable composition containing a polyisocyanate compound, a polythiol compound, a dye L having a maximum absorption wavelength from 550 to 600 nm in a 20 ppm-by-mass toluene solution, a dye S having a maximum absorption wavelength of 500 nm or greater but less than 550 nm in a 20 ppm-by-mass toluene solution, with a mass ratio of dye L and dye S ranging from 5 to 500, and optionally an UV absorber.

In view of the foregoing, there is a need for providing a material comprising means capable of at least partially blocking transmission of phototoxic blue light, while keeping a good transparency (i.e. a high level of transmission) and while exhibiting a final color that is well accepted by the customer.

Especially, the first level of acceptance of a lens is that the lens should have an attractive color when the lens is observed (not worn) by a customer.

Another objective, when the optical article is an ophthalmic system, is to obtain both satisfactory wearer protection against harmful wavelengths and wearer satisfaction. In this regard, the optical article should provide a high comfort to the wearer in terms of visibility. An acceptable overall level of light transmission is also needed, as well as acceptable color perception for a user. The optical article should not impair dramatically the wearer's color vision, and resistant to photo-degradation.

Also, and preferably, in terms of perception, it is better if the optical article preserves the color of the skin when the wearer is seen and preserves sufficient brightness and visual contrast. Evaluation protocols such as those disclosed in WO 2017/077358 can be implemented.

The present inventors have found that at least some of these objectives can be achieved by providing an alternative optical material that is cosmetically acceptable, comprising a color balancing agent (bluing agent) in higher concentration than the one usually used to ensure the neutralization of the yellow shade generated by blue light absorption by the blue light blocking means. The resulting optical material exhibits a pleasant bluish color that is more attractive to users.

To address the needs of the present invention and to remedy to the mentioned drawbacks of the prior art, the applicant provides an optical material comprising at least one UV absorber that at least partially blocks light having a wavelength ranging from 400 to 450 nm, preferably from 420 to 450 nm, at least one absorbing dye A having its maximum absorption wavelength in the range from 520 nm to 640 nm, the optical material being made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers, the optical material having a colorimetric coefficient b* as defined in the CIE (1976) L*a*b* international colorimetric system that is lower than or equal to 6, for an optical material thickness of 2 mm, and a hue angle h as defined in the CIE (1976) L*a*b* international colorimetric system higher than or equal to 120° and lower than or equal to 180°, for an optical material thickness of 2 mm.

Optical materials having a bluish appearance are expected to exhibit a hue angle h as defined in the CIE (1976) L*a*b* international colorimetric system ranging from 200° to 280°. Here, it was surprisingly found that an optical material having a hue angle h as defined in the CIE (1976) L*a*b* international colorimetric system higher than or equal to 120° and lower than or equal to 180° had a bluish appearance. This finding, which is opposite to what is expected in the optics field, is particularly advantageous, since the amount of absorbing dye A to be used for obtaining said hue angle h higher than or equal to 120° and lower than or equal to 180° is less than the amount necessary to obtain a hue angle h ranging from 200° to 280°.

The optical material according to the invention is preferably used as the substrate of an optical article. It is generally comprised in a transparent optical article, in particular an optical lens or lens blank, more preferably an ophthalmic lens or lens blank.

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

In other embodiments, the optical material is used to form a coating, film or laminate useful e.g. in antireflective films or in liquid crystal display components. Optical materials are more particularly described hereunder in the context of a use as lens substrate, but are not limited to this use, even if this use is preferred.

The term "ophthalmic lens" is used to mean a lens adapted to a spectacle frame to protect the eye and/or correct the sight. Said lens can be chosen from afocal, unifocal, bifocal, trifocal, progressive lenses and Fresnel lenses. Although ophthalmic optics is a preferred field of the invention, it will be understood that this invention can be applied to optical elements of other types where filtering UV and blue wavelengths may be beneficial, such as, for example, lenses for optical instruments, filters particularly for photography or astronomy, optical sighting lenses, ocular visors, optics of lighting systems, screens, glazings, etc.

If the optical article is an optical lens, it may be coated on its front main surface, rear main side, or both sides with one or more functional coatings. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material may act as support for a stack of one or more coatings or layers.

The substrate of the article of the invention is an organic glass substrate, for instance an organic glass made from a thermoplastic or thermosetting plastic, generally chosen from transparent materials of ophthalmic grade used in the ophthalmic industry. It is preferably made from a thermoset resin.

There are no particular restrictions on the method used to manufacture the optical article which includes a substrate made of an optical material according to the invention.

The polymer matrix of the present optical substrate can be obtained from methods that are well known to those of ordinary skill in the art, typically from an optical material composition ("substrate composition") comprising polymerizable compounds such as monomers and/or oligomers. In the present description, monomers or oligomers encompass pre-polymers.

The present optical material is made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers. The preferred optical materials are polythiourethane materials and materials resulting from the polymerization or copolymerization of polyepisulfide monomers or oligomers.

Polythiourethanes can be obtained from polyisocyanate (or polyisothiocyanate) compounds and polythiol compounds.

By polyisocyanate, it is meant any compound comprising at least two isocyanate groups, in other words diisocyanates, triisocyanates, etc. Polyisocyanate pre-polymers may be used. The polyisocyanate component which may be used to synthesize the polyurethane includes polyisocyanate compounds with isocyanate groups which are "free", "blocked" or "partially blocked", and mixtures of "blocked" and "unblocked" compounds. The term "blocked" means that the polyisocyanates have been changed in a known way to introduce urea (biurea derivative), carbodiimide, urethane (allophanate derivative), isocyanurate groups (cyclic trimer derivative), or by reaction with an oxime.

The polyisocyanates may be selected from aliphatic, aromatic, cycloaliphatic or heterocyclic polyisocyanates and mixtures thereof. Generally, aliphatic polyisocyanates are used because of their superior ultraviolet light stability and non-yellowing tendencies.

The polyisocyanates of the invention are preferably diisocyanates. Among the available diisocyanates may be cited toluene-2,4-diisocyanate, toluene-2,6-diisocyanate, diphenylmethane-4,4'-diisocyanate, diphenylmethane-2,4'-diisocyanate, paraphenylene diisocyanate, xylylene diisocyanate, biphenyl-diisocyanate, 3,3'-dimethyl-4,4'-diphenylene diisocyanate, tetramethylene-1,4-diisocyanate, hexamethylene-1,6-diisocyanate, 2,2,4-trimethyl hexane-1,6-diisocyanate, lysine methyl ester diisocyanate, bis(isocyanatoethyl) fumarate, isophorone diisocyanate (IPDI), ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydro diphenylmethane-2,4'-diisocyanate, perhydro phenylmethane-4,4'-diisocyanate (or bis-(4-isocyanatocyclohexyl)-methane, or 4,4'-dicyclohexylmethanediisocyanate), bis(isocyanatomethyl)cyclohexane, dicyclohexylmethane diisocyanate, 2,5 (or 2,6)-bis(isocyanatomethyl)bicyclo-[2.2.1]-heptane, and their mixtures.

Other non-limiting examples of polyisocyanates are the isocyanurates from isophorone diisocyanate and 1,6-hexamethylene diisocyanate, both of which are commercially available. Further polyisocyanates suitable for the present invention are described in detail in WO 98/37115, WO 2014/133111 or EP 1877839.

The polythiols that may be used in the present invention are defined as compounds comprising at least two sulfhydryl (mercapto) groups, in other words dithiols, trithiols, tetrathiols etc. Polythiols pre-polymers may be used.

The preferred polythiol monomers and/or oligomers suitable in accordance with the present invention, there may be cited aliphatic polythiols such as trimethylolpropanetris(2-mercaptoacetate), trimethylolpropanetris(3-mercaptopropionate), trimethylolethanetris(2-mercaptoacetate), trimethylolethanetris(3-mercaptopropionate), pentaerythritoltetrakis(2-mercaptoacetate), pentaerythritoltetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl) sulfide, bis(mercaptopropyl)disulfide, 4-mercaptomethyl-1,8-dimercapto-3,6-dithiaoctane, 4,8(or 4,7 or 5,7)-dimercaptomethyl-1,11-dimercapto-3,6,9-trithiaundecane, 2,5-dimercaptomethyl-1,4-dithiane, and 2,5-bis[(2-mercaptoethyl)thiomethyl]-1,4-dithiane, 1-(1'-mercaptoethylthio)-2,3-dimercaptopropane, 1-(2'-mercapropylthio)-2,3-dimercaptopropane, 1-(3'-mercapropylthio)-2,3-dimercaptopropane, 1-(4'-mercabutylthio)-2,3-dimercaptopropane, 1-(5'-mercapentylthio)-2,3-dimercaptopropane, 1-(6'-mercahexylthio)-2,3-dimercaptopropane, 1,2-bis-(4'-mercaptobutylthio)-3-mercaptopropane, 1,2-bis-(5'-mercaptopentylthio)-3-mercaptopropane, 1,2-bis-(6'-mercaptohexylthio)-3-mercaptopropane, 1,2,3-tris(mercaptomethylthio)propane, 1,2,3-tris-(3'-mercaptopropylthio)propane, 1,2,3-tris-(2'- mercaptoethylthio)propane, 1,2,3-tris-(4'-mercaptobutylthio)propane, 1,2,3-tris-(6'-mercaptohexylthio)propane, methanedithiol, 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(2'-mercaptoethylthio)-3-mercaptopropane. Further examples of polythiols can be found in WO 2014/133111 or EP 1877839.

Preferred embodiments are combination of xylylene diisocyanate and pentaerythritoltetrakis(3-mercaptopropionate); combination of xylylene diisocyanate and 4-mercaptomethyl-1,8-dimercapto-3,6-dithiaoctane; combination of 2,5 (or 2,6)-bis(isocyanatomethyl)bicyclo-[2.2.1]-heptane, pentaerythritoltetrakis(3-mercaptopropionate) and 4-mercaptomethyl-1,8-dimercapto-3,6-dithiaoctane; combination of xylylene diisocyanate and 4,8(or 4,7 or 5,7)-dimercaptomethyl-1,11-dimercapto-3,6,9-trithiaundecane; combination of dicyclohexylmethane diisocyanate and 4,8(or 4,7 or 5,7)-dimercaptomethyl-1,11-dimercapto-3,6,9-trithiaundecane; or a combination of bis(2,3-epithiopropyl)disulfide and 4,8(or 4,7 or 5,7)-dimercaptomethyl-1,11-dimercapto-3,6,9-trithiaundecane.

Specific examples of polythiourethane resins suitable to the present invention are those marketed by the Mitsui Toatsu Chemicals company as MR® series, in particular MR6®, MR7® (refractive index: 1.67), MR8® (refractive index: 1.6) resins, MR10® (refractive index: 1.67). These optical materials as well as the monomers used for their preparation are especially described in the U.S. Pat. Nos. 4,689,387, 4,775,733, 5,059,673, 5,087,758 and 5,191,055.

Polyepisulfide materials can be obtained from the reaction of at least one polyepithio (polyepisulfide) monomer or oligomer and at least one polythiol compound (described above), or by performing ring-opening polymerization on a polyepithio compound.

Especially suitable monomers with epithio functions are linear aliphatic beta-epithiopropylthio compounds such as bis(2,3-epithiopropyl)sulfide, bis(2,3-epithiopropyl)disulfide, bis[4-(beta-epithiopropylthio)phenyl]sulfide, bis[4-(beta-epithiopropyloxy)cyclohexyl]sulfide. Further examples of polyepithio compounds can be found in WO 2014/133111.

A specific example of a commercially available polyepisulfide based material is the one having a refractive index of 1.74 that can be obtained from Mitsui or MGC.

Polyurethane ureas are reaction products of polyurethane pre-polymers and polyamine curing agents, typically diamines. A commercially available example is Trivex® (refractive index: 1.53) from PPG Industries.

By polyamine, it is meant a chemical compound having at least two amine groups, preferably from 2 to 6 amine groups. The polyamine may be a primary or secondary polyamine, or a compound comprising both the primary or secondary amine functions. The polyamine preferably comprises amino groups $NH_2$ (primary polyamine) or primary amino groups (secondary polyamine), more preferably amino groups. The polyamine may be aliphatic or aromatic, including heterocyclic. Useful polyamines include phenylene diamines such as paraphenylene diamine and aliphatic diamines, in particular of $H_2N—(CH_2)_n—NH_2$ type, n ranging from 2 to 10, especially ethylene diamine, 1,4-butylene diamine, 1,6-hexamethylene diamine, 1,10-diaminodecane, 4,4'-diaminodicyclohexylmethane, and 1-amino-3-aminomethyl-3,5,5-trimetrylcyclohexane.

Polyurethanes are obtained from polyisocyanate compounds and polyol compounds. The polyols (abbreviation of polyhydric alcohols) which may be used in the present invention are defined as compounds comprising at least two hydroxyl groups, in other words diols, triols, tetrols etc. Polyols pre-polymers may be used.

Non-limiting examples of polyols which may be used in the present invention include (1) polyols of low molecular weight, in other words polyols with a number average molecular weight less than 400, for example aliphatic diols, such as the C2-C10 aliphatic diols, triols, and higher polyols; (2) polyester polyols; (3) polyether polyols; (4) polyols containing amide groups; (5) polyacrylic polyols; (6) epoxypolyols; (7) polyvinyl polyols; (8) urethane polyols; and (9) polycarbonate polyols. Detailed examples of useful polyol compounds can be found in WO 2014/133111 or WO 2017/077359.

Polyurethanes useful for the invention are described in U.S. Pat. Nos. 5,962,617 and 6,127,505, incorporated here by reference.

In another embodiment, the optical material is made of a material chosen from materials resulting from the polymerization or copolymerization of allylic monomers or oligomers. The allyl monomer or allyl oligomer is a compound comprising at least one allyl group.

Said compound may be selected in the group consisting of allyl glycol carbonates such as diethylene glycol bis(allyl carbonate), neopentyl glycol bis (allyl carbonate), ethylene glycol bis(allyl carbonate), oligomers of diethylene glycol bis(allyl carbonate), oligomers of ethylene glycol bis(allyl carbonate), bisphenol A bis(allyl carbonate), diallylphthalates such as diallyl phthalate, diallyl isophthalate and diallyl terephthalate, triallyl isocyanurate, triallyl cyanurate, diallyl maleate, diallyl fumarate, diallyl adipate, triallyl trimellitate, tetraallyl pyromellitate, glycerin diallyl ether, trimethylolpropane diallyl ether, pentaerythritol diallyl ether, and sorbitol diallyl ether.

In one embodiment, the optical material results from the polymerization or copolymerization of alkylene glycol bis allyl carbonates such as polymers and copolymers of diethylene glycol bis(allylcarbonate), marketed, for instance, under the trade name CR-39® by the PPG Industries company, the corresponding marketed lenses being referred to as ORMA® lenses from ESSILOR.

The allyl containing polymerizable composition may also comprise a second monomer or oligomer that is capable of polymerizing with the allyl monomer or oligomer described above (examples thereof are given in EP 3282290), and optionally a catalyst that is suitable for allyl monomer polymerization, typically a radical generating polymerization catalyst, such as for example an organic peroxide, an organic azo compound, and mixtures thereof.

The optical material according to the invention comprises at least one absorptive optical filtering means (UV absorber) that at least partially blocks incident light having a wavelength ranging from 400 to 450 nm, preferably 420 to 450 nm (within blue light range), i.e., inhibits transmission in the phototoxic spectral range through at least one geometrically defined surface of the substrate of the optical article, preferably an entire main surface.

UV absorbers are frequently incorporated into optical articles in order to reduce or prevent UV light from reaching the retina (in particular in ophthalmic lens materials). The UV absorber that may be used in the present invention preferably have the ability to at least partially block light having a wavelength shorter than 400 nm, preferably UV wavelengths below 385 or 390 nm, but also have an absorption spectrum extending to the visible blue light range of the electromagnetic spectrum (400-450 nm), in particular 420-450 nm. Most preferred ultraviolet absorbers have a maximum absorption peak in a range from 250 to 400 nm, preferably from 350 nm to 370 nm and/or do not absorb light in the 465-495 nm range, preferably the 450-550 nm range.

Said UV absorbers both protect the user's eye from UV light and the substrate material itself, thus preventing it from weathering and becoming brittle and/or yellow. Further, the UV absorbers of the invention are efficient to improve blue light cutting by absorption, even when used in small amounts. The resulting optical material thus provides a high level of retinal cell protection against retinal cell apoptosis or age-related macular degeneration.

The UV absorber according to the invention can be, without limitation, a benzophenone-based compound, a benzotriazole-based compound or a dibenzoylmethane-based compound, preferably a benzotriazole compound. Suitable UV absorbers include without limitation 2-(2-hydroxyphenylybenzotriazoles such as 2-(2-hydroxy-3-tert-butyl-5-methylphenyl)-5-chlorobenzotriazole (Seesorb® 703/Tinuvin® 326), or other allyl hydroxymethylphenyl chlorobenzotriazoles, 2-(5-chloro-2H-benzotriazol-2-yl)-6-(1,1-dimethylethyl)-4-methylphenol (Viosorb 550), n-octyl-3-[3-tert-butyl-4-hydroxy-5-(5-chloro-2H-benzotriazol-2-yl)phenyl] propionate (Eversorb® 109), 2-(2-hydroxy-5-methoxyphenyl)benzotriazole, 2-(2-hydroxy-5-butoxyphenyl)benzotriazole and also Tinuvin®CarboProtect® from BASF. Preferred absorbers are of the benzotriazole family. Other examples of benzotriazole UV absorbers protecting from blue light can be found in WO 2017/137372.

Further useful UV absorbers according to the invention include 5-chloro-2-hydroxybenzophenone, 2-[4,6-bis(1,1'-biphenyl-4-yl)-1,3,5-triazine-2-yl]-5-[(2-ethylhexyl)oxy] phenol (Tinuvin® 1600), 2-[2-hydroxy-3-(dimethylbenzyl)-5-(1,1,3,3-tetramethylbutyl) phenyl]-2H-benzotriazole (Tinuvin® 928) and 4-tert-butyl-4'-methoxydibenzoylmethane (Eusolex® 9020).

In one embodiment, the optical material further comprises at least one UV absorber that does not block light having a wavelength ranging from 400 to 450 nm.

The following UV absorbers have less absorption in the wavelength ranging from 400 to 450 nm and have to be used at higher concentrations, or in addition to the previously cited UV absorbers: 2-(2'-hydroxy-5'-t-octylphenyl) benzotriazole (Seesorb® 709), 2-(3'-methallyl-2'-hydroxy-5'-methyl phenyl) benzotriazole, 2-(3,5-di-t-amyl-2-hydroxyphenyl) benzotriazole, octyl-3-[3-tert-butyl-4-hydroxy-5-(2H-benzotriazol-2-yl)-phenyl] propionate in which the octyl moiety is a mixture of branched and linear alkyls, and the 2-hydroxy-5-acryloxyphenyl-2H-benzotriazoles disclosed in U.S. Pat. No. 4,528,311.

The UV absorbers according to the invention do preferably not comprise any unsaturated polymerizable group or cross-linking group, such as a non aromatic C=C double bond, which could reticulate the compound within the optical material during polymerization.

The amount of UV absorber compounds according to the invention used herein is an amount sufficient to provide a satisfactory protection from blue light and UV light but not excessive so as to prevent precipitation. The inventive UV absorber compounds are generally present in an amount ranging from 0.05 to 4% by weight relative to the optical material total weight (or per 100 parts by weight of the polymerizable compounds or relative to the weight of the optical material composition), preferably from 0.1 to 3% by weight, more preferably from 0.1 to 2% by weight.

In one embodiment, the optical material further comprises at least one absorbing dye B having its maximum absorption wavelength (among visible wavelengths) in the range from 410 nm to 450 nm. In the present description, peak ranges are given for a 20 ppm-by-weight solution of dye in toluene.

The chemical nature of absorbing dye B, which is a yellow dye, is not particularly limited, provided that it has its maximum absorption peak within the 410-450 nm range. The FWHM (Full Width at Half Maximum) is preferably lower than 40 nm, preferably lower than 30 nm. Preferably, dye B has its maximum absorption peak in the range from 410 nm to 428 nm, preferably in the range from 415 nm to 428 nm. As used herein, having an absorption peak in a range of wavelengths means that the maximum of the absorption peak falls within this range, said absorption being measured by obtaining an absorption spectrum (absorbance as a function of wavelength) of the optical article having the optical filtering means incorporated therein.

Preferred absorbing dyes B have a narrow absorption band in the 410-450 nm range of the electromagnetic spectrum, preferably in the 420-450 nm range. Ideally, said absorption band is centered on around 420-430 nm. They preferably do not absorb, or very little (typically less than 5%), in regions of the visible spectrum outside the 410-450 nm wavelength range.

Preferably, absorbing dye B selectively inhibits light within the 410 nm-450 nm range. As used herein, a means "selectively inhibits" a wavelength range if it inhibits at least some transmission within the 410-450 nm range, while having little or no effect on transmission of visible wavelengths outside the wavelength range, unless specifically configured to do so.

Indeed, absorbing dye B may inhibit, to a certain degree, transmission of incident light of wavelengths outside the 410-450 nm range, usually by absorption.

Absorbing dye B can be chosen from porphyrins, porphyrin complexes, other heterocycles related to porphyrins, including corrins, chlorins and corphins, derivatives thereof, or the perylene, coumarin, acridine, indolenin (also known as 3H-indole), anthraquinone, azobenzene, phthalocyanine, cyanines, quinoline, benzotriazole, nitrobenzene, isoquinoline, isoindoline, diarylmethane and indol-2-ylidene families. Derivatives are substances generally issued by an addition or substitution. Specific examples include auramine 0; coumarin 343; coumarin 314; nitrobenzoxadiazole; *lucifer* yellow CH; 9,10-bis(phenylethynyl)anthracene; proflavin; 4-(dicyanomethylene)-2-methyl-6-(4-dimethylaminostyryl)-4H-pyran; 2-[4-(dimethylamino)styryl]-1-methypyridinium iodide, lutein, zeaxanthin, T890, and yellow dyes having a narrow absorption peak available from Exciton Inc. such as ABS-419®, ABS-420® or ABS-430®. The preferred dye B is ABS-420®.

The absorbing dyes B are generally present in an amount ranging from 0.1 to 10,000 ppm by weight relative to the optical material total weight (or relative to the weight of the optical material composition), preferably from 1 to 1000 ppm.

The optical material according to the invention preferably blocks or cuts at least 80% of the light having a wavelength ranging from 280 to 380 nm (preferably from 280 to 400 nm, still more preferably from 280 to 405 nm), more preferably at least 90% and still more preferably at least 95%, essentially through absorption by the UV absorber(s). In most preferred embodiments, at least 96%, 97%, 98%, 99%, 99.5%, 99.9%, or 100% of light in the 280-380 nm or 280-400 nm ranges is blocked.

In one embodiment, the amount of light having a wavelength ranging from 400 to 450 nm blocked by the optical article ranges from 8 to 50%, more preferably from 10 to 40%, even more preferable from 12 to 30%.

In the present application, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. In the present description, unless otherwise specified, light blocking is defined with reference to an angle of incidence ranging from 0° to 15°, preferably 0°.

In addition, light blocking is considered here for an optical material devoid of any coating, especially antireflective coating. It means that light reflected by optical material is not transmitted and considered as blocked.

The light cut-off wavelength of the (uncoated) optical material is preferably higher than or equal to 390 nm, more preferably higher than or equal to 393 nm, and even more preferably higher than or equal to 395 nm. It is preferably lower than 465 nm, more preferably lower than 450 nm. In the present disclosure, the light cut-off wavelength is defined as the wavelength below which light transmission becomes lower than 1%. In other words, it is the highest wavelength for which the transmittance is lower than 1%. The higher the light cut-off wavelength, the better the blue light cutting properties.

In the present description, unless otherwise specified, optical transmittances/transmissions are measured at the center of the optical article for a thickness ranging from 0.7 to 2 mm, preferably 2 mm, at normal incidence (0°). As used herein, optical transmittance within a wavelength range is an average of light transmitted within this range and is not weighted according to the sensitivity of the eye at each wavelength of the range, unless otherwise specified. Last, optical transmittance is measured for optical articles having no coatings, in particular no antireflective coatings, unless otherwise specified. In particular, reflection at both air/substrate interfaces reduces significantly optical transmittance, around 4-5% for each interface, i.e. 8-10% for a lens.

Further, it may be particularly desirable in some cases to selectively filter a relatively small portion of the blue spectrum, i.e., within the 380-450 nm region, preferably the 420 nm-450 nm region. Indeed, it has been found that blocking too much of the blue spectrum can interfere with scotopic vision and mechanisms for regulating biorhythms, referred to as "circadian cycles". Thus, in a preferred embodiment, the optical material blocks less than 1% of light having a wavelength ranging from 465 to 495 nm, preferably from 450 to 550 nm. In this embodiment, the optical material selectively blocks the phototoxic blue light and transmits the blue light implicated in circadian rhythms. Preferably, the optical material transmits at least 85% of light having a wavelength ranging from 465 to 495 nm, more preferably from 450 to 550 nm. This transmittance is an average of light transmitted within the range that is not weighted according to the sensitivity of the eye at each wavelength of the range. In another embodiment, the optical material does not absorb light in the 465-495 nm range, preferably the 450-550 nm range.

These levels of light inhibition by absorption can be controlled by adjusting the concentration of the absorbing dye and/or UV absorber and are expressed relative to the amount of light that would be transmitted at the same wavelength range in the absence of the optical filtering means.

Blue light protection provided by the optical articles of the invention measured by the BVC(B') (Blue violet cut) in the range 400-450 nm defined later in this application ranges from 18-50%, more preferably 18 to 40%, better 20 to 40% and even better 20 to 35%.

In order to compensate for the yellowing effect of the blue light blocking compounds incorporated into the substrate (UV absorbers, optional absorbing dye B . . . ) and obtaining an optical article having a cosmetically acceptable appearance for the wearer and when viewed by an external observer, the optical material comprises at least one absorbing dye A having its maximum absorption wavelength (among visible wavelengths) in the range from 520 nm to 640 nm, preferably from 550 to 620 nm, more preferably from 550 to 610 nm, 555 to 610 nm, 570 to 620 nm or 560 to 600 nm. It is used as a color-balancing component. In other words, absorbing dye A at least partially blocks light having a wavelength in such ranges.

Absorbing dye A is a bluing agent, i.e., a compound having generally an absorption band in the visible light spectrum in the orange to yellow wavelength region and manifesting a color from blue to violet (blue to violet tinting dye).

Examples of absorbing dyes A include inorganic dyes and pigments such as ultramarine blue, iron blue (Prussian blue—potassium ferric ferrocyanide), and cobalt blue; and organic dyes and pigments such as phthalocyanine compounds, monoazo compounds, diazo compounds, azine compounds, triallylmethane compounds, and condensed polycyclic compounds (e.g. indigo compounds and anthraquinone compounds).

Specifically, typical examples of absorbing dyes A include Solvent Violet 13 (trade names: "MACROLEX Violet B" supplied by Bayer or Clariant, "DIARESIN Blue G" supplied by Mitsubishi Chemical Corporation, "SUMIPLAST Violet B" supplied by Sumitomo Chemical Co., Ltd.), Solvent Violet 31 (trade name: "DIARESIN Violet D" supplied by Mitsubishi Chemical Corporation), Solvent Violet 33 (trade name: "DIARESIN Blue J" supplied by Mitsubishi Chemical Corporation), Solvent Violet 94 (trade name: "DIARESIN Blue N" supplied by Mitsubishi Chemical Corporation), Solvent Violet 36 (trade name: "MACROLEX Violet 3R" supplied by Bayer), Solvent Blue 97 (trade name: "MACROLEX Blue RR" supplied by Bayer), Solvent Blue 45 (trade name: "Polysynthren blue RLS" supplied by Sandoz), "NBK-1035 blue" supplied by Nubiola, "Oil Black SF" supplied by Chuo synthetic Chemical Co., Ltd., "Oil Black 109" supplied by 3C Chuo synthetic Chemical Co., Ltd., "SUDAN Black 141" supplied by Chuo synthetic Chemical Co., Ltd., "NEO SUPER Black C-832" supplied by Chuo synthetic Chemical Co., Ltd., "OIL BLUE BA" supplied by Chuo synthetic Chemical Co., Ltd., Morplas Blue from Morton International, Inc., D&C Violet #2 available from Sensient Corp., "OIL BLUE 8BN" supplied by Chuo synthetic Chemical Co., Ltd., methylene blue, Solvent Violet 11, 14, 26, 37, 38, 45, 47, 48, 51, 59, and 60, and Disperse Violet 26, 27, and 28. Mixtures of any of the aforementioned dyes and pigments can be used.

The preferred absorbing dye A is an anthraquinone dye, preferably Solvent Violet 33 or Solvent Violet 13.

The absorbing dye A is not used in an amount necessary to obtain a colorless appearance. The objective of the present invention is not providing an optical material perceived as mostly color neutral. Rather, the absorbing dye A is used in a higher amount, sufficient to adjust the hue of the optical material to bluish perception, typically from 0.1 to 1000 ppm, preferably from 0.1 to 100 ppm by weight, relative to the total weight of the optical material (or per weight of the polymerizable compounds or relative to the optical material composition total weight). This amount depends on the nature (strength) and the amount of the compounds cutting blue light that are used, and on the final color and transmission desired. Those of skill in the art should appreciate that the respective amounts of dye A and blue light cutting compounds have to be adapted to each other to produce a transparent, bluish material. To this end, the optimal amounts of each compound can be determined by simple laboratory experiments.

The optical material or article according to the invention can comprise at least one other color balancing agent and/or optical brightener in order to at least partially offset the color imparted by the dye. More details concerning this embodiment, such as the arrangement of the color-balancing component or optical brightener relative to a system blocking blue light wavelengths, and further exemplary systems including a blue light blocking component and a color-balancing component can be found e.g. in WO 2017/077358, U.S. Pat. No. 8,360,574, WO 2007/146933, WO 2015/097186 and WO 2015/097492.

In one embodiment, the optical material or article according to the invention does not comprise any absorbing dye C having a maximum absorption wavelength of 500 nm or greater and less than 550 nm. Examples of absorbing dyes C can be found in the application WO 2018/021567, such as Solvent Red 52, Solvent Red 168 or Solvent Red 146.

In one embodiment, the optical material or article according to the invention comprises at least one absorbing dye C having a maximum absorption wavelength of 500 nm or greater and less than 550 nm, such as Solvent Red 52, Solvent Red 168 or Solvent Red 146.

In one embodiment, the optical material or article does not contain nanoparticles containing or encapsulating at least one light absorbing additive, which can be a dye (including a pigment) or an UV absorber. In one embodiment, dye A, and/or dye B and/or the UV absorber according to the invention are not contained or encapsulated in nanoparticles.

In one embodiment, the optical material or article contains nanoparticles including or encapsulating dye A and/or dye B and/or an UV absorber according to the invention. Said nanoparticles can contain these compounds individually or as mixtures. This embodiment is more particularly described in WO 2018/029540.

The optical material according to the invention preferably has a relative light transmission factor in the visible spectrum Tv higher than or equal to 82%, preferably higher than or equal to 83%, more preferably higher than or equal to 84%, and better higher than or equal to 85%.

Optical articles made from optical material according to the invention can be coated with antireflective coatings on one or both air/substrate interface(s). In such embodiments, Tv factor preferably ranges from 85% to 99%, more preferably from 88% to 98%, even better from 88% to 97%.

An antireflective coating is by definition a coating that decrease the reflection compared to the reflection of the article without the antireflective coating.

When an antireflective coating is deposited on optical articles, the mean light reflection factor $R_v$ of the face of the lens coated by an anti-reflection coating is preferably lower than 2.5% (per face), preferably lower than 2%, more preferably lower than 1%, even more preferably ≤0.75%, and even more preferably ≤0.5%, per face of the article.

The "mean light reflection factor," noted $R_v$, is such as defined in the ISO 13666:1998 Standard, and measured in accordance with the ISO 8980-4 Standard (for an angle of incidence lower than 17°, typically of 15°), i.e. this is the weighted spectral reflection average over the whole visible spectrum between 380 and 780 nm.

The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The optical material according to the invention has improved color properties, as it is color-balanced by the absorbing dye A, which can be quantified by the yellowness index Yi. The degree of whiteness of the inventive optical material may be quantified by means of colorimetric measurements, based on the CIE tristimulus values X, Y, Z such as described in the standard ASTM E313 with illuminant C and observer 2°. The optical material according to the invention preferably has a low yellowness index Yi, i.e., lower than or equal to 5, more preferably lower than or equal to 4, 3 or 2, as measured according to the above standard. The yellowness index Yi is calculated per ASTM method E313 through the relation $Yi=(127.69\ X-105.92\ Z))/Y$, where X, Y, and Z are the CIE tristimulus values.

The colorimetric coefficients a*, b*, C* and h of the optical material of the invention in the international colorimetric CIE L*a*b* are calculated between 380 and 780 nm, for light transmitted through the optical material at an angle of incidence ranging from 0° to 15°, especially 0°, using standard observer 10° and standard illuminant D65, for an optical material thickness of 2 mm. The observer is a "standard observer" (10°) as defined in the international colorimetric system CIE L*a*b*.

The optical material according to the invention has a colorimetric coefficient b* as defined in the CIE (1976) L*a*b* international colorimetric system that is lower than or equal to 6, preferably lower than or equal to 5.5, more preferably lower than or equal to 5, 4.5, 4, 3.5, 3, 2.5, 2 or 1.5 (for an optical material thickness of 2 mm), and in a general manner higher or equal to 0. The low colorimetric coefficient b* of the optical material can be correlated with its non yellow appearance.

The optical material according to the invention has a colorimetric coefficient a* as defined in the CIE (1976) L*a*b* international colorimetric system that is preferably higher than or equal to −5 and preferably lower than or equal to 3, more preferably lower than or equal to 1, and which preferably ranges from −5 to −1, more preferably from 0 to −2.5.

The optical material according to the invention has a hue angle h as defined in the CIE (1976) L*a*b* international colorimetric system higher than or equal to 120° and lower than or equal to 180°, preferably higher than or equal to 120° and lower than or equal to 145°, more preferably higher than or equal to 120° and lower than or equal to 140° (for an optical material thickness of 2 mm). With this range of hue angles, the optical materials are expected to be perceived by observers as greenish in transmission. Surprisingly, the present optical materials are perceived by observers as bluish in transmission, i.e., as if they had a hue angle ranging from 200° to 280°.

In other embodiments, the optical material according to the invention has a hue angle h as defined in the CIE (1976) L*a*b* international colorimetric system higher than or equal to 121°, 122° or 123°.

The optical article of the invention, which may comprise one or more coatings such as an antireflective coating, preferably exhibits the values of the colorimetric coefficients h, C*, b* and a* disclosed in the context of the optical material.

Therefore, the invention also relates to an optical article comprising a substrate with a front main face and a rear main face, wherein said substrate comprises an optical material including at least one UV absorber that at least partially blocks light having a wavelength ranging from 400 to 450 nm, at least one absorbing dye A having its maximum absorption wavelength in the range from 520 nm to 640 nm, the optical material being made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers, the optical article:
  having a colorimetric coefficient b* as defined in the CIE (1976) L*a*b* international colorimetric system that is lower than or equal to 6, for an optical material thickness of 2 mm,
  having a hue angle h as defined in the CIE (1976) L*a*b* international colorimetric system higher than or equal to 120° and lower than or equal to 180°, for an optical material thickness of 2 mm.

The concentration of the dyes/pigments and UV absorbers can be adjusted to obtain the desired h, C*, b* and a* colorimetric coefficients and the desired level of blue light blocking in the 400-450 nm range.

The refractive index of the optical material is preferably 1.53 or greater, more preferably 1.55 or greater, more preferably 1.58 or greater, and still more preferably 1.60 or greater, and it is preferably 1.80 or less, more preferably 1.70 or less, and still more preferably 1.67 or less. Unless otherwise specified, the refractive indexes referred to in the present application are expressed at 25° C. at a wavelength of 550 nm.

The optical material of the invention limits or avoids the photo-degradation of dyes that are generally sensitive to light, in particular UV rays and/or sunlight.

The invention also relates to the use of the above described optical material for protecting at least part of an eye of a user from phototoxic blue light, stated otherwise light having a wavelength ranging from 400 to 450 nm, preferably from 420 to 450 nm.

In some aspects of the invention, the optical material has a chroma (C*) that is lower than 10 (for an angle of incidence of 15°), more preferably lower than 5, 4, 3.5 or 3. Obtaining low residual color intensity (chrome) articles is preferable with respect to wearer's comfort viewpoint, in the cases of lenses.

The absorbing dyes and UV absorbers of the present invention can be incorporated into the mass of the optical material/substrate by methods well known in the art, preferably during the manufacture of the substrate itself, for example by casting polymerization or injection molding. As used herein, a dye may refer to both a pigment, which is insoluble in its vehicle, and a dye, which either is itself a liquid or is soluble in its vehicle.

This is preferably carried out by mixing the compound in the optical material composition (an optical material resin or a polymerizable composition) and then forming the substrate-borne UV and blue light filter by curing the (liquid) composition in an appropriate mold.

More specifically, the optical material composition is poured into the cavity of a mold held together using a gasket or tape. Depending on the desired characteristics of the resulting optical material, degassing can be performed under reduced pressure and/or filtration can be performed under increased pressure or reduced pressure before pouring the optical material composition in the mold. After pouring the composition, the casting mold, preferably a lens casting mold, can be heated in an oven or a heating device immersed in water according to a predetermined temperature program to cure the resin in the mold. The resin molded product may be annealed if necessary.

Other methods can also be employed, in particular when an absorbing dye or UV absorber is not sufficiently resistant to the high temperatures involved during casting or injection molding. Such methods include impregnation or imbibition methods consisting in dipping the substrate in an organic solvent and/or water based hot bath in which the compound in question has been dispersed (which then diffuses in the body of the substrate), the diffusion methods described in JP 2000-314088 and JP 2000-241601, involving an impregnable temporary coating, or contactless coloration using a sublimable material, such as described in U.S. Pat. Nos. 6,534,443 and 6,554,873. These methods are described in more details in, e.g., WO 2017/077357.

The optical material composition can contain additives commonly used in the art other than those mentioned above, for example internal mold release agents, resin modifiers, light stabilizers, polymerization catalysts, color balancing agents, chain extenders, crosslinking agents, free radical scavengers such as antioxidants or hindered amine light stabilizers (HALS), further dyes, pigments, fillers, and adhesion accelerators.

The optical material composition according to the invention generally comprises a system for initiating the polymerization (catalyst). The polymerization initiating system can comprise one or more thermal or photochemical polymerization initiating agents or alternatively, a mixture of thermal and photochemical polymerization initiating agents, depending on the nature of the polymerizable compounds. Generally, the initiating agents are used in a proportion of 0.01 to 5% by weight with respect to the total weight of polymerizable compounds present in the composition.

In particular, for substrates resulting from polymerization or (co)polymerization of polyurethane urea and polythiourethane resins, preferred catalysts are selected from alkyltins, alkyltin oxides, metal coordination complexes or amines, more preferably alkyltins. A preferred proportion for alkyltins is 0.02 to 2% by weight with respect to the total weight of polymerizable compounds present in the composition. Preferred alkyltins are dibutyltin dichloride and dimethyltin dichloride.

Thus, the invention also relates to a method for preparing an optical material such as herein described, comprising:
  preparing an optical material composition by mixing at least one UV absorber that at least partially blocks light having a wavelength ranging from 400 to 450 nm, at least one absorbing dye A having its maximum absorption wavelength in the range from 520 nm to 640 nm, and a material or compounds chosen from a polythiourethane material or precursors thereof, a polyurethane urea material or precursors thereof, a material resulting from the polymerization or copolymerization of polyepisulfide monomers or oligomers or a precursor thereof, and a material resulting from the polymerization or copolymerization of allylic monomers or oligomers or a precursor thereof, and
  curing said an optical material composition, preferably in a mold, so as to form the optical material comprising a polymer matrix and said at least one UV absorber and absorbing dye A.

The method generally involves the preparation of a polymerizable composition comprising the desired dyes/pigments and UV absorbers, and at least one polymerizable compound.

In a preferred embodiment, said at least one polymerizable compound is selected from allyl glycol carbonates, polythiols, polyols, polyamines, polyepisulfides, polyisocyanates and polyisothiocyanates.

In one embodiment of the invention, the polymerizable composition is prepared by first mixing the UV absorbers with at least one first monomer to obtain a homogeneous first composition, and then at least one second monomer is optionally added in said composition to obtain a second composition. Additives such as catalysts can be added to the first and/or second composition. The absorbing dye A is preferably added to the second composition.

The process according to the invention is advantageous since it requires no specific steps such as tinting and no specific coating comprising UV absorbers.

The invention further relates to an optical article comprising a substrate with a front main face and a rear main face, wherein said substrate comprises an optical material as disclosed in the present description. The optical article is preferably an ophthalmic lens, such as a plastic eyeglasses lens.

In one embodiment, the optical article is made of an optical material comprising:
at least one UV absorber that at least partially blocks light having a wavelength ranging from 400 to 450 nm,
at least one absorbing dye A having its maximum absorption wavelength in the range from 520 nm to 640 nm,
the optical material:
being made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers,
having a colorimetric coefficient b* as defined in the CIE (1976) L*a*b* international colorimetric system that is lower than or equal to 6, preferably lower than or equal to any one of following values: 5.5, 5, 4, 3, for an optical material thickness of 2 mm,
having a hue angle h as defined in the CIE (1976) L*a*b* international colorimetric system higher than or equal to 120° and lower than or equal to 180°.

The following examples illustrate the present invention in a more detailed, but non-limiting manner. Unless stated otherwise, all thicknesses disclosed in the present application relate to physical thicknesses.

EXAMPLES

1. Chemicals Used

Optical materials were prepared from a composition comprising polymerizable monomers, dimethyltin dichloride as a catalyst (CAS No. 753-73-1), Diaresin Blue J® (bluing agent also known as Solvent Violet 33, CAS No. 86090-40-6, supplied by Mitsubishi Chemical Corporation) or Solvent Violet 13 (CAS No. 81-48-1, supplied by Clariant) as an absorbing dye A, Zelec UN® as a mold release agent, one or more UV absorbers for at least partially inhibiting light having a wavelength ranging from 400 to 450 nm and optionally ABS-420® as an absorbing dye B having its maximum absorption wavelength in the range from 410 nm to 450 nm (selective yellow dye having a narrow absorption peak centered at around 421 nm, supplied by Exciton Inc.).

The monomers used in the present examples were norbornane diisocyanate (ISO, CAS No. 74091-64-8), the pentaerythritol tetrakis (3-mercaptopropionate) (THIOL1, CAS No. 7575-23-7), and 2,3-bis((2-mercaptoethyl)thio)-1-propanethiol (THIOL2, CAS No. 131538-00-6), in order to produce the polythiourethane matrix having a refractive index of 1.6.

The UV absorbers according to the invention used in the examples were Seesorb® 709 (2-(2-hydroxy-5-tert-octylphenyl)benzotriazole, CAS No. 3147-75-9, supplied by Shipro Kasei Kaisha), Seesorb® 703 (2-(2-hydroxy-3-tert-butyl-5-methylphenyl)-5-chlorobenzotriazole, CAS No. 3896-11-5, supplied by Shipro Kasei Kaisha), Eversorb® 109 (n-octyl-3-[3-tert-butyl-4-hydroxy-5-(5-chloro-2H-benzotriazol-2-yl)phenyl] propionate, CAS No. 83044-89-7, UV absorber offering protection against blue light, supplied by Everlight Chemical), 5-chloro-2-hydroxybenzophenone (noted UV absorber 1, CAS No. 85-19-8, supplied by Sigma-Aldrich), Eusolex® 9020 (4-tert-butyl-4'-methoxydibenzoylmethane, also known as avobenzone, CAS No. 70356-09-1, supplied by Merck KGaA), Tinuvin® 928 (2-[2-hydroxy-3-(dimethylbenzyl)-5-(1,1,3,3-tetramethylbutyl) phenyl]-2H-benzotriazole), and Tinuvin® 1600 (2-[4,6-bis(1,1'-biphenyl-4-yl)-1,3,5-triazin-2-yl]-5-[(2-ethylhexyl)oxy]phenol, supplied by BASF).

2. Manufacture of Lenses by Casting

Convex and concave molds were assembled by using typing process. A center thickness adjustment was made to obtain 2 mm thick samples.

The formulations of examples 1-2628 were prepared in small batch size by using a 100 mL Duran bottle with a glass tube for nitrogen intake and a vacuum connection. The UV absorber component was mixed with the ISO monomer (isocyanate part) at room temperature (25° C.) until a homogeneous mixture was obtained or, if the UV absorber was not dissolved at room temperature (25° C.), under moderate heat (30° C.).

The dimethyl tin dichloride catalyst was added in the reaction mixture, which was then cooled down to 10° C. prior to addition of the thiol monomers THIOL1 and THIOL2, and stirred under vacuum until homogeneous. The absorbing dyes and the mold release agent were added at the end of the preparation. In some embodiments, absorbing dye A is introduced as a solution in the monomer THIOL2.

The assembled molds were filled with the final formulations using a syringe, and the polymerization reaction was carried out in a regulated electronic oven at maximum 130° C. for 1 day. The molds were then disassembled to obtain plano (no power) lenses with 2 mm center thickness comprising a body of a thermoset material. The lenses were cleaned by immersion and sonication in a surfactant solution, then rinsed and dried.

3. Characterizations

The optical characteristics of the lenses were determined using a Cary 4000 spectrophotometer from Hunter. The light transmission factor in the visible spectrum Tv was measured in transmission mode from a wearer's view angle, with the back (concave) side of the lens (2 mm thickness at the center) facing the detector and light incoming on the front side of the lens. Tv was measured under D65 illumination conditions (daylight). The light cut-off wavelength was determined from the transmission spectra.

The yellowness index Yi of the prepared lenses was calculated as described above, by measuring on a white background with the above spectrophotometer the CIE tristimulus values X, Y, Z such as described in the standard ASTM E 313-05, through reflection measures, with the front (convex) side of the lens facing the detector and light incoming on said front side. This way of measuring Yi, from an observer's view angle, is the closest to the actual wearing situation.

Protection from phototoxic blue light was evidenced by calculating the mean blue light protection factor BVC between 400 nm and 450 nm, weighted by the light hazard function B'(λ), based on the transmission spectrum. Such factor is defined through the following relation and measured at 0° incidence:

$$BVC = 100\% - \frac{\int_{400}^{450} B'(\lambda) \cdot T(\lambda) \cdot d\lambda}{\int_{400}^{450} B'(\lambda) \cdot d\lambda}$$

wherein T(λ) represents the lens transmission factor at a given wavelength, measured at an incident angle between 0 to 17°, preferably at 0°, and B'(λ) represents the light hazard function shown on figure 1 of publication WO 2017/077359, in the name of the Applicant (relative spectral function efficiency). Said light hazard function results from work between Paris Vision Institute and Essilor International. It can be seen on this figure that blue light is the most dangerous to human eye at 428-431 nm. A few values of the B'(λ) function between 400 and 450 nm are given hereunder:

| Wavelength (nm) | Weighting coefficient B'(λ) |
|---|---|
| 400 | 0.1618 |
| 410 | 0.3263 |
| 420 | 0.8496 |
| 430 | 1.00 |
| 440 | 0.6469 |
| 450 | 0.4237 |

Resistance of the inventive lenses to photo-degradation was evaluated following exposure to the sun conditions of the Q-sun test. The Q-sun test consists in introducing the prepared material in a Q-SUN® Xe-3 xenon chamber, reproducing full spectrum sunlight, purchased from Q-LAB, at a relative humidity of 20% (±5%) and at a temperature of 23° C. (±5° C.), and exposing it to irradiation for 40 h or 80 h. The optical characteristics of the lenses were measured by Cary 4000 spectrophotometer again to get a new transmission spectrum and calculate the changes caused by the Q-sun test.

4. Formulations Prepared and Results

The formulations prepared and the characterizations of these formulations and the final lenses are shown in the tables hereunder.

| Compound | Examples | | | | | | |
|---|---|---|---|---|---|---|---|
| (parts by weight) | 1 | 2 | 3 | 4 | 5 | 6 | 7 |
| ISO | 49.9395 | 49.9395 | 49.9395 | 49.9395 | 50.1437 | 50.1437 | 50.1437 |
| THIOL1 | 23.5880 | 23.5880 | 23.5880 | 23.5880 | 23.6845 | 23.6845 | 23.6845 |
| THIOL2 | 25.1669 | 25.1669 | 25.1669 | 25.1669 | 25.2698 | 25.2697 | 25.2697 |
| Catalyst | 0.0395 | 0.0395 | 0.0395 | 0.0395 | 0.0396 | 0.0396 | 0.0396 |
| Zelec UN ® | 0.0691 | 0.0691 | 0.0691 | 0.0691 | 0.0694 | 0.0694 | 0.0694 |
| Seesorb ® 709 | 1.1843 | 1.1843 | 1.1843 | 1.1843 | | | |
| Seesorb ® 703 | 0.0123 | 0.0123 | 0.0123 | 0.0123 | | | |
| Eversorb ® 109 | | | | | 0.7928 | 0.7928 | 0.7928 |
| Tinuvin ® 1600 | | | | | | | |
| Dye A (bluing agent) Diaresin Blue J ® | 0.000197 | 0.000217 | 0.000237 | 0.000257 | 0.000248 | 0.000297 | 0.000347 |
| Dye B (yellow dye) | 0.000049 | 0.000049 | 0.000049 | 0.000049 | | | |
| Yi | 2.02 | 1.82 | 1.47 | 1.23 | 2.12 | 1.54 | 0.82 |
| L* | 94.64 | 94.63 | 94.51 | 94.42 | 94.31 | 94.18 | 94.02 |
| a* | −1.32 | −1.33 | −1.35 | −1.37 | −2.34 | −2.33 | −2.33 |
| b* | 1.71 | 1.61 | 1.43 | 1.31 | 2.94 | 2.62 | 2.24 |
| C* | 2.16 | 2.08 | 1.96 | 1.89 | 3.75 | 3.50 | 3.23 |
| h (°) | 127.73 | 129.60 | 133.30 | 136.18 | 128.50 | 131.58 | 136.13 |
| BVC (%) | 24 | 24 | 24 | 24 | 34 | 33 | 33 |
| Light cut-off (nm) | 396 | 396 | 396 | 396 | 406 | 406 | 406 |
| Tv (%) | 86.73 | 86.68 | 86.41 | 86.16 | 85.97 | 85.63 | 85.23 |

| Compound | Examples | | |
|---|---|---|---|
| (parts by weight) | 8 | 9 | 10 |
| ISO | 50.3432 | 50.3432 | 50.3432 |
| THIOL1 | 23.7787 | 23.7787 | 23.7787 |
| THIOL2 | 25.3703 | 25.3702 | 25.3701 |
| Catalyst | 0.0398 | 0.0398 | 0.0398 |
| Zelec UN ® | 0.0696 | 0.0696 | 0.0696 |
| Tinuvin ® 1600 | 0.3980 | 0.3980 | 0.3980 |
| Dye A (bluing agent) Diaresin Blue J ® | 0.000298 | 0.000398 | 0.000497 |
| Yi | 0.76 | 0.15 | −1.80 |
| L* | 93.57 | 93.52 | 92.69 |
| a* | −2.08 | −2.01 | −1.98 |
| b* | 1.66 | 1.29 | 0.27 |
| C* | 2.69 | 2.41 | 2.00 |
| h (°) | 142.17 | 147.90 | 172.20 |
| BVC (%) | 29 | 28 | 29 |
| Light cut-off (nm) | 394 | 393 | 393 |
| Tv (%) | 84.17 | 84.03 | 82.04 |

-continued

| Compound | Examples | | | | | |
|---|---|---|---|---|---|---|
| (parts by weight) | 11 | 12 | 13 | 14 | 15 | 16 |
| ISO | 50.3834 | 50.3834 | 50.3834 | 50.2433 | 50.2433 | 50.2433 |
| THIOL1 | 23.7977 | 23.7977 | 23.7977 | 23.7315 | 23.7315 | 23.7315 |
| THIOL2 | 25.3906 | 25.3905 | 25.3904 | 25.3199 | 25.3198 | 25.3197 |
| Catalyst | 0.0398 | 0.0398 | 0.0398 | 0.0397 | 0.0397 | 0.0397 |
| Zelec UN ® | 0.0697 | 0.0697 | 0.0697 | 0.0695 | 0.0695 | 0.0695 |
| UV absorber 1 | 0.3186 | 0.3186 | 0.3186 | | | |
| Eusolex ® 9020 | | | | 0.5958 | 0.5958 | 0.5958 |
| Dye A (bluing agent) Diaresin Blue J ® | 0.000199 | 0.000299 | 0.000398 | 0.000298 | 0.000397 | 0.000496 |
| Yi | 2.86 | 1.55 | 0.22 | 2.81 | 1.84 | 0.39 |
| L* | 94.76 | 94.25 | 93.78 | 94.23 | 93.64 | 93.15 |
| a* | −2.07 | −2.06 | −2.04 | −2.41 | −2.50 | −2.47 |
| b* | 2.87 | 2.15 | 1.43 | 3.21 | 2.73 | 1.96 |
| C* | 3.54 | 2.98 | 2.49 | 4.01 | 3.70 | 3.15 |
| h (°) | 125.93 | 133.80 | 145.00 | 126.88 | 132.50 | 141.73 |
| BVC (%) | 29 | 29 | 29 | 32 | 33 | 33 |
| Light cut-off (nm) | 393 | 393 | 393 | 407 | 407 | 407 |
| Tv (%) | 87.04 | 85.80 | 84.63 | 85.79 | 84.36 | 83.17 |

| Compound | Examples | | | | | |
|---|---|---|---|---|---|---|
| (parts by weight) | C1 | 17 | 18 | 19 | 20 | 21 |
| ISO | 49.02 | 49.02 | 49.02 | 49.02 | 49.02 | 49.02 |
| THIOL1 | 23.16 | 23.16 | 23.16 | 23.16 | 23.16 | 23.16 |
| THIOL2 | 24.71 | 23.35 | 23.16 | 22.96 | 22.77 | 22.57 |
| Catalyst | 0.04 | 0.04 | 0.04 | 0.04 | 0.04 | 0.04 |
| Zelec UN ® | 0.05 | 0.05 | 0.05 | 0.05 | 0.05 | 0.05 |
| Seesorb ® 709 | 1.94 | 1.94 | 1.94 | 1.94 | 1.94 | 1.94 |
| Seesorb ® 703 | 0.12 | 0.12 | 0.12 | 0.12 | 0.12 | 0.12 |
| Tinuvin ® 928 | 0.97 | 0.97 | 0.97 | 0.97 | 0.97 | 0.97 |
| Dye A (bluing agent) Solvent Violet 13 | | 1.36 | 1.55 | 1.74 | 1.94 | 2.13 |
| Yi | 5.3 | 3.4 | 2.86 | 2.8 | 2.5 | 2.3 |
| L* | 95.7 | 94.9 | 95.1 | 94.9 | 94.8 | 94.7 |
| a* | −2.4 | −2.4 | −2.32 | −2.4 | −2.4 | −2.4 |
| b* | 4.7 | 3.7 | 3.24 | 3.4 | 3.2 | 3.1 |
| C* | 5.3 | 4.4 | 4.06 | 4.1 | 4 | 3.9 |
| h (°) | 116.8 | 122.9 | 124.8 | 125.5 | 126.8 | 128 |
| BVC (%) | 33.3 | 33.7 | 33.2 | 33.3 | 33 | 33.1 |
| Light cut-off (nm) | 407 | 407 | 407 | 407 | 407 | 407 |
| Tv (%) | 89.5 | 87.5 | 87.8 | 87.3 | 87.2 | 86.9 |

| Compound | Examples | | | | |
|---|---|---|---|---|---|
| (parts by weight) | 22 | 23 | 24 | 25 | 26 |
| ISO | 49.02 | 49.02 | 49.02 | 49.02 | 49.02 |
| THIOL1 | 23.16 | 23.16 | 23.16 | 23.16 | 23.16 |
| THIOL2 | 22.96 | 22.77 | 22.57 | 22.38 | 22.19 |
| Catalyst | 0.04 | 0.04 | 0.04 | 0.04 | 0.04 |
| Zelec UN ® | 0.05 | 0.05 | 0.05 | 0.05 | 0.05 |
| Seesorb ® 709 | 1.94 | 1.94 | 1.94 | 1.94 | 1.94 |
| Seesorb ® 703 | 0.12 | 0.12 | 0.12 | 0.12 | 0.12 |
| Tinuvin ® 928 | 0.97 | 0.97 | 0.97 | 0.97 | 0.97 |
| Diaresin Blue J ® | 1.74 | 1.94 | 2.13 | 2.33 | 2.52 |
| Yi | 3.1 | 2.9 | 2.87 | 2.4 | 2.3 |
| L* | 94.9 | 94.8 | 94.7 | 94.5 | 94.3 |
| a* | −2.3 | −2.4 | −2.43 | −2.4 | −2.4 |
| b* | 3.5 | 3.4 | 3.42 | 3.1 | 3.1 |
| C* | 4.2 | 4.1 | 4.19 | 3.9 | 3.9 |
| h (°) | 124 | 125 | 125.4 | 127.3 | 127.9 |
| BVC (%) | 33.1 | 33.2 | 33.1 | 33.4 | 34 |
| Light cut-off (nm) | 407 | 407 | 407 | 407 | 407 |
| Tv (%) | 87.3 | 87.1 | 86.8 | 86.5 | 85.9 |

| Example | Q-sun Time (h) | Light cut-off (nm) | Tv (%) | Yi | L* | a* | b* | C* | h*(°) | ΔYi (%) | Δb* (%) |
|---|---|---|---|---|---|---|---|---|---|---|---|
| 18 | 0 | 407 | 87.8 | 2.86 | 95.1 | −2.32 | 3.34 | 4.06 | 124.8 | — | — |
| Dye A: | 40 | 406 | 87.5 | 2.87 | 94.9 | −2.30 | 3.32 | 4.04 | 124.7 | 0.35 | −0.60 |
| Solvent Violet 13 | 80 | 406 | 87.6 | 2.88 | 95.0 | −2.29 | 3.32 | 4.04 | 124.6 | 0.70 | −0.60 |
| 24 | 0 | 407 | 86.8 | 2.87 | 94.7 | −2.43 | 3.42 | 4.19 | 125.4 | — | — |
| Dye A: | 40 | 407 | 86.9 | 2.81 | 94.7 | −2.38 | 3.35 | 4.11 | 125.4 | −2.09 | −2.05 |
| Diaresin Blue J® | 80 | 407 | 86.9 | 2.92 | 94.7 | −2.41 | 3.43 | 4.19 | 125.1 | 1.74 | 0.29 |

Lenses with blue light cutting feature were made using different additives for reducing transmission of light in the range 400-450 nm (various UV absorbers partially blocking blue light, and an absorbing dye B in examples 1-4), and the color generated by these additives was modified by adding various levels of absorbing dye A as a bluing agent. Increasing the amounts of bluing agent allows to obtain a range of lenses with increasing bluish aspect.

The results show that the optical articles according to the invention achieved good protection from blue light (BVC: 24-34%), good protection from UV light (light cut-off wavelength≥393 nm), high transmission in the visible spectrum (Tv>82%, without any antireflective coatings), and good cosmetic appearance (low Yi).

Increasing the amount of absorbing dye A (bluing agent) lowers the transmission (Tv), the yellowness index Yi and b*, while a* remains constant, thus adding a "pure blue" contribution without green or red trend.

The absence of significant variation of Yi and b* after Q-sun testing for 80 h indicates that the absorbing dyes A used are photo-stable: lenses do not appear more yellow after ageing under harsh UV exposure.

Sensory Analysis

Tests performed confirmed better acceptance of lenses according to the invention.

1$^{st}$ Test:

On a panel of 5 people, lenses according to the invention were positioned on a white plastic polymer substrate mat and without optical brightener and their tinge observed in transmission under a non direct fluorescent source to avoid as much as possible seeing light reflection on the lens surface.

For all observers, the lenses were spontaneously identified as having a bluish tinge.

2$^{nd}$ Test:

Lenses of the invention were positioned and observed as in the first test with comparative lenses, namely commercial blue light cutting lenses having the following features:

a*=−1.9, b*=3.6 h=118° C.=4.1 BVC=28% Tv(D65)=95%

All lenses of the invention were preferred in view of the comparative commercial lenses that are seen yellow-green.

The invention claimed is:

1. An optical material comprising:
   at least one UV absorber that at least partially blocks light having a wavelength ranging from 400 to 450 nm;
   at least one absorbing dye A having its maximum absorption wavelength in the range from 520 nm to 640 nm;
   wherein the optical material:
   is made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers;
   has a colorimetric coefficient b* as defined in CIE (1976) L*a*b* international colorimetric system that is lower than or equal to 6, for an optical material thickness of 2 mm; and
   has a hue angle h as defined in CIE (1976) L*a*b* international colorimetric system higher than or equal to 120° and lower than or equal to 180°, for an optical material thickness of 2 mm.

2. The optical material of claim 1, further defined as having a hue angle h as defined in CIE (1976) L*a*b* international colorimetric system higher than or equal to 1200 and lower than or equal to 145°, for an optical material thickness of 2 mm.

3. The optical material of claim 1, wherein said absorbing dye A has a maximum absorption wavelength in the range from 550 nm to 610 nm.

4. The optical material of claim 1, wherein said absorbing dye A is an anthraquinone dye.

5. The optical material of claim 4, wherein said absorbing dye A is Solvent Violet 33 or Solvent Violet 13.

6. The optical material of claim 1, further defined as having a relative light transmission factor in the visible spectrum Tv, as defined in standard NF EN 1836, higher than or equal to 82%.

7. The optical material of claim 1, further defined as having a colorimetric coefficient a* as defined in CIE (1976) L*a*b* international colorimetric system that is lower than or equal to 3, for an optical material thickness of 2 mm.

8. The optical material of claim 1, further defined as having a colorimetric coefficient b* as defined in CIE (1976) L*a*b* international colorimetric system that is lower than or equal to 5.5, for an optical material thickness of 2 mm.

9. The optical material of claim 8, further defined as having a colorimetric coefficient b* as defined in CIE (1976) L*a*b* international colorimetric system that is lower than or equal to 5, for an optical material thickness of 2 mm.

10. The optical material of claim 1, further defined as being made of a material chosen from polythiourethane materials and materials resulting from the polymerization or copolymerization of polyepisulfide monomers or oligomers.

11. The optical material of claim 1, wherein the absorbing dyes A are present in an amount ranging from 0.1 to 1000 ppm by weight, relative to the total weight of the optical material.

12. The optical material of claim 1, wherein the UV absorbers are present in an amount ranging from 0.05 to 4% by weight, relative to the total weight of the optical material.

13. The optical material of claim 1, further defined as not comprising any absorbing dye C having a maximum absorption wavelength of 500 nm or greater and less than 550 nm.

14. The optical material of claim 1, further comprising at least one absorbing dye B having its maximum absorption wavelength in the range from 410 nm to 450 nm.

15. An optical article comprising a substrate with a front main face and a rear main face, wherein said substrate comprises the optical material of claim 1.

16. The optical article of claim 15, further defined as an ophthalmic lens.

17. An optical article comprising a substrate with a front main face and a rear main face, wherein said substrate comprises an optical material including at least one UV absorber that at least partially blocks light having a wavelength ranging from 400 to 450 nm, at least one absorbing dye A having its maximum absorption wavelength in the range from 520 nm to 640 nm, the optical material being made of a material chosen from polythiourethane materials, polyurethane urea materials, materials resulting from the polymerization or copolymerization of polyepisulfide monomers or oligomers, and materials resulting from the polymerization or copolymerization of allylic monomers or oligomers, the optical article:

having a colorimetric coefficient b* as defined in CIE (1976) L*a*b* international colorimetric system that is lower than or equal to 6, for an optical material thickness of 2 mm; and having a hue angle h as defined in CIE (1976) L*a*b* international colorimetric system higher than or equal to 120° and lower than or equal to 180°, for an optical material thickness of 2 mm.

18. A method for manufacturing the optical material of claim 1, comprising:

preparing an optical material composition by mixing at least one UV absorber that at least partially blocks light having a wavelength ranging from 400 to 450 nm, at least one absorbing dye A having its maximum absorption wavelength in the range from 520 nm to 640 nm, and a material or compounds chosen from a polythiourethane material or precursors thereof, a polyurethane urea material or precursors thereof, a material resulting from the polymerization or copolymerization of polyepisulfide monomers or oligomers or a precursor thereof, and a material resulting from the polymerization or copolymerization of allylic monomers or oligomers or a precursor thereof; and curing said an optical material composition.

* * * * *